Figure 8:
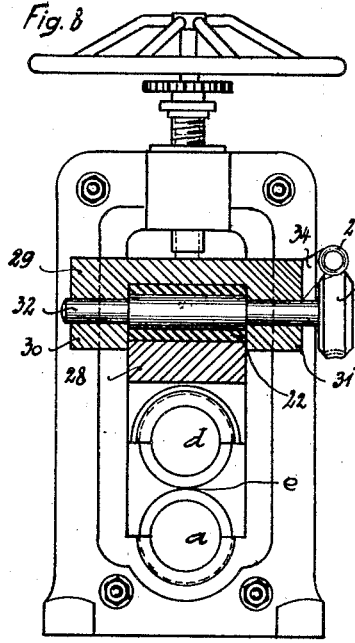

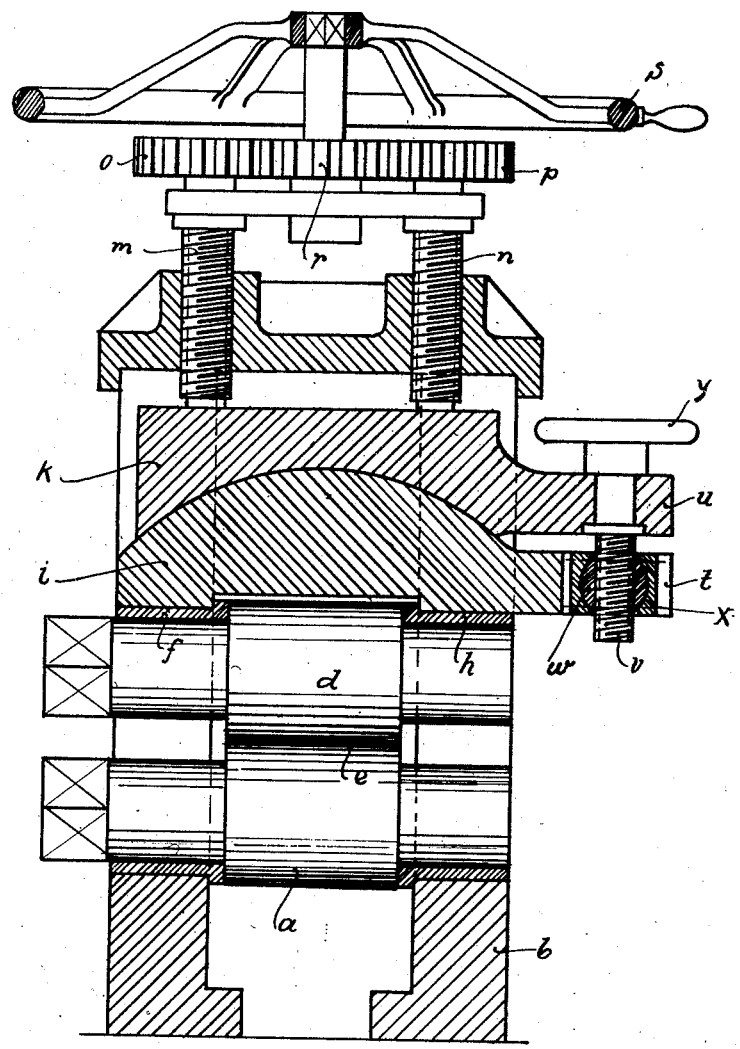

Jan. 1, 1929.
R. KRONENBERG
1,697,012
ROLLING MILL
Filed Aug. 25, 1926   3 Sheets-Sheet 2
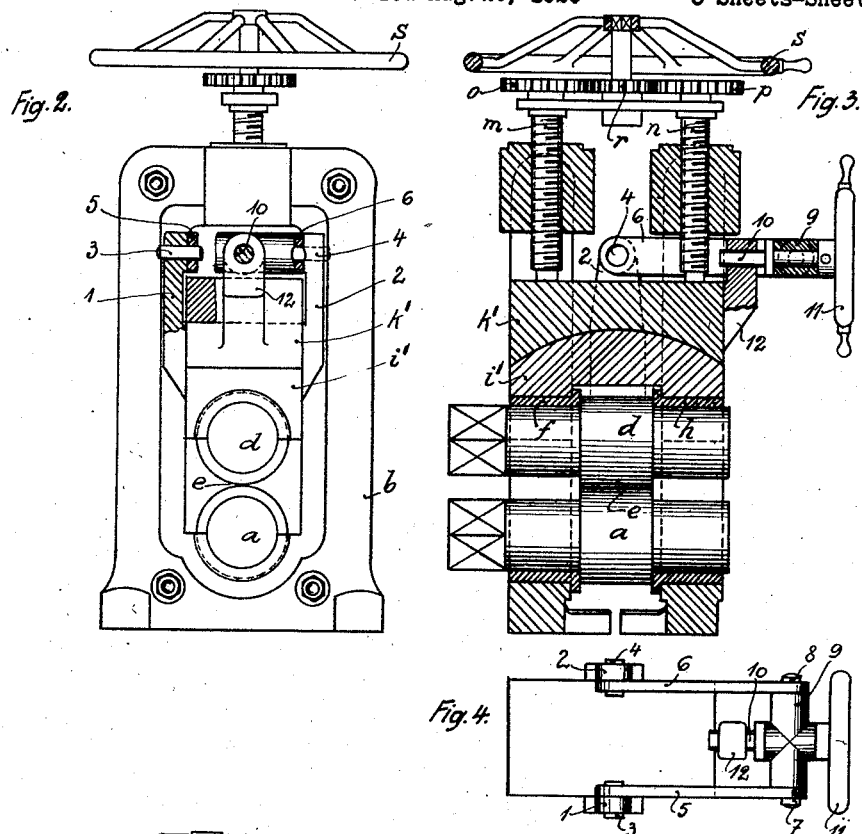
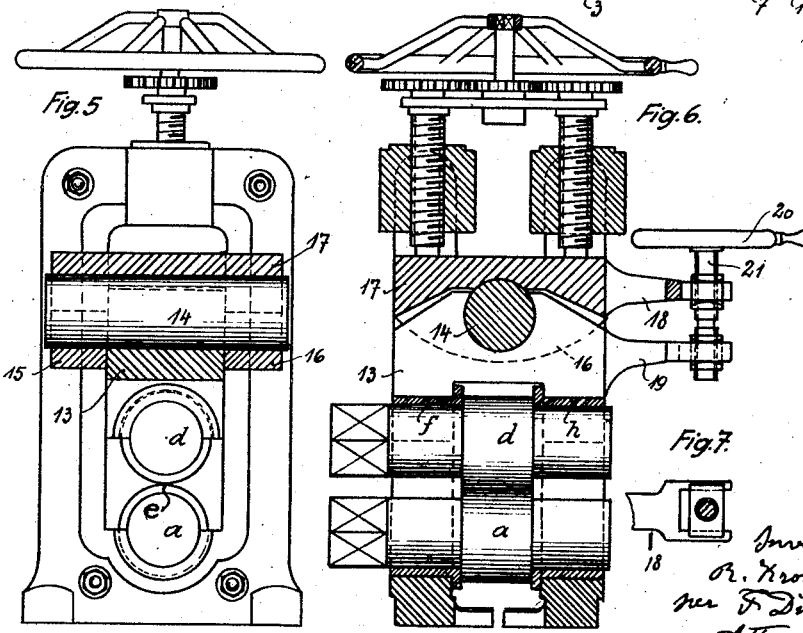

Patented Jan. 1, 1929.

1,697,012

UNITED STATES PATENT OFFICE.

RUDOLF KRONENBERG, OF HAUS KRONENBERG, GERMANY.

ROLLING MILL.

Application filed August 25, 1926, Serial No. 131,438, and in Germany June 17, 1926.

The invention relates to cold or hot rolling mills of various kinds, particularly those for rolling bands of iron or other metals. In such and other rolling mills it is known to provide one roller, usually the upper, with an adjusting device whereby the thickness of rolling can be regulated. This is most commonly effected by means of two screw spindles which operate on the end bearings of the roller and are rotatably borne in the top cross beam of the framework. At their upper ends the spindles carry toothed wheels which are usually rotate together by a hand wheel through a central toothed wheel. A completely uniform adjustment of the roller bearings and therefore of the roller, cannot nevertheless be achieved by this or similar arrangements. If the rolled material runs crooked or curved (sabre shaped), the teeth of one toothed wheel must be unmeshed from the central wheel, in order to permit the other spindle alone to be adjusted. This is objectionable and time wasting, is not always sufficiently accurate, and above all does not permit constant regulation and control, in order to compensate immediately possible errors. This is far better achieved by the present invention.

This consists in the roller which is adjustable in height by screw spindles or other means, being connected with special means which permit this roller to be tilted, or one roller bearing to be pressed more than the other, instantaneously by easy hand operation, whereby unevenness in the rolled material can be compensated during rolling as it occurs. If now the rolled material runs crooked or curved, a sign that the rollers are not absolutely parallel, then the special means has only to be operated in the one or other direction to effect immediate correction of the error and to obtain straight running of the rolled material. Before the commencement of rolling, the desired thickness is set as accurately as possible by the screw spindle through the hand-wheel, during which setting fine adjustment may be aided by means of micrometer divisions. From then, further regulation of the evenness of the rolled material is effected by the special device. The mean thickness of the rolled material remains unchanged and the new device serves only to preserve the rectangular cross section of rolling and to prevent the formation even to the slightest extent, of a trapezium cross section. Whether the rollers are in correct adjustment can be accurately observed from the running out of the rolled material and regulation can be effected in accordance.

Various embodiments of the invention are shown in the accompanying drawing without all its possibilities being exhausted. In all these arrangements, the control of the adjustable roller is effected without changing the thickness, and solely for the purpose of obtaining a straight rolled band.

Figure 9:
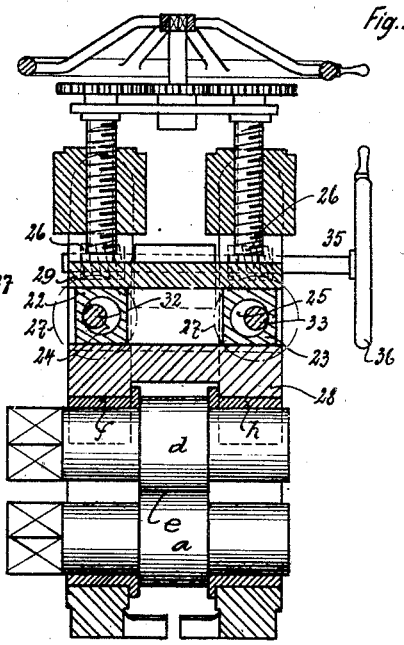
Figure 10:
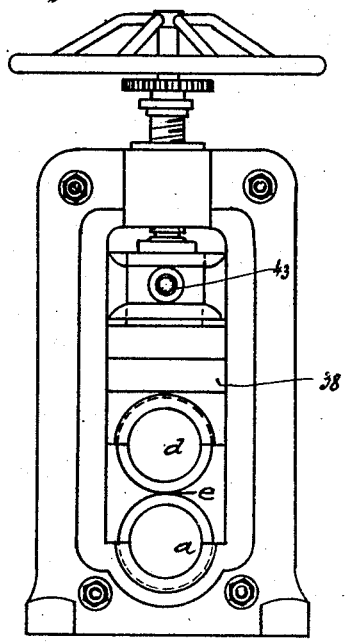
Figure 11:
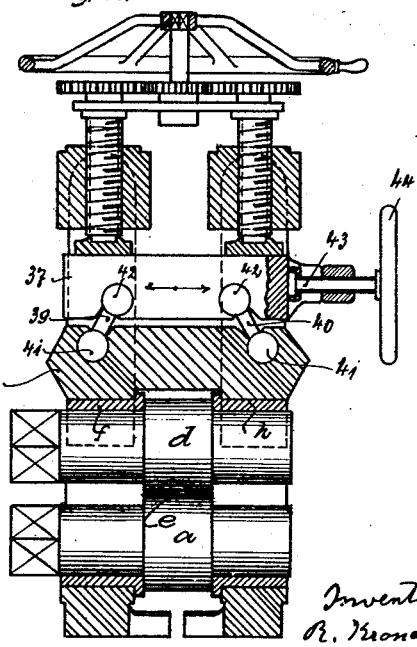

Fig. 1 is a vertical section.
Fig. 2 is an end elevation.
Fig. 3 is a vertical section at right angles to Fig. 2.
Fig. 4 is a top plan.
Fig. 5 is an end elevation, partly in section.
Fig. 6 is a section at right angles to Fig. 5.
Fig. 7 is a detail in plan.
Fig. 8 is an end view partly in section, of a modified form.
Fig. 9 is a section at right angles to Fig. 8.
Fig. 10 is an end view of still another form.
Fig. 11 is a section at right angles to Fig. 10.

In the first embodiment according to Figure 1, the lower roller $a$ is borne in fixed position in the roller frame $b$. The upper roller $d$ together with its bearings can be oscillated preferably about the centre point of the roller contact line $e$, for which purpose the end bearings $f$ and $h$ are connected together by a convex formed cross piece $i$, above which lies a similarly hollowed head piece $k$ which is flat on top and bears with this flat surface against the screw spindles $m$ and $n$. These spindles in known manner carry at their upper ends toothed wheel $o$ and $p$ which mesh with a common centre wheel $r$, which can be rotated by hand through the capstan wheel $s$. For fine adjustment micrometer divisions can be provided on the capstan wheel or at some other suitable place. The axis of the cylindrical contact surface between the members $i$ and $k$ here passes through the centre point of the roller contact line $e$.

For the adjustment of the oscillatable roller $d$, arm $t$ and $u$ are provided rigid with the members $i$ and $k$. A vertical spindle $v$ is rotatably borne in the upper arm $u$. The lower threaded part of the spindle meshes with a nut $w$ rotatable in a sleeve $x$ slidable in the arm $t$. If now the spindle $v$ is rotated by means of the hand wheel $y$ the arms $t$ and $w$ move together or apart, thus causing the parts $i$ and $k$ to slide on their cylindrical contact surfaces and the roller $d$ and bearings $h$ to oscillate.

To obtain great precision it is further important to ensure that the members $i$ and $k$ do not expand unevenly through rolling heat. For this purpose these members may be provided with suitable cooling arrangements; for example they may be made hollow and the hollow space used for water cooling.

In rolling mills with more than two rollers, the invention can also be used with several rollers. This applies as well to the form described above as to those described below.

Figures 2 to 4 show an embodiment which differs from Figure 1 only in the method of moving and adjusting the oscillating member $i'$ in relation to the stationary member $k'$. On the member $i'$ are mounted two strong upwardly directed arms 1 and 2 in the upper ends of which engage pivots 3 and 4 of horizontal links or rods 5 and 6, which engage at the side of the framework on outer pins 7 and 8 of a cross member 9, which can be moved to and fro by a screw spindle 10 and control wheel 11. The screw spindle is borne in an arm 12 on the member $k'$. If the control wheel is turned the rods 5 and 6 and arms 1 and 2 are moved and in this way adjustment is effected of the member $i'$ with the roller $d$.

While in the above described embodiments the centre of oscillation of the member $i$ is preferably approximately at the centre of the roller contact line $e$, the further embodiment shown in Figures 5 to 7 provides a construction in which the member 13 connecting the roller bearings $f$ and $h$ oscillates about a strong pin 14 above the roller $d$, borne in strong side projections 15 and 16 on the upper abutment member 17. The arrangement for adjusting the roller corresponds in essence with the arrangement of Figure 1. Here also side arms 18 and 19 are provided on the members 13 and 17 and carried to approach or recede from one another by a screw spindle 21 with right and left hand threads, operated by a control wheel 20. The roller $d$ oscillates about the axis of the pin 14.

Figures 8 and 9 show an embodiment in which the adjustment of the roller $d$ is effected by two eccentrics 24 and 25, borne in blocks 22 and 23 which are moved simultaneously in opposite directions by worms 26 and and worm wheels 27 which rotate these eccentrics. The blocks 22 and 23 lie between the members 28 connecting the two roller bearings $f$ and $h$, and the upper abutment member 29, in downward projections 30 and 31 of which are borne the eccentric shafts 32 and 33. The abutment member 29 also carries the bearing 34 for the worm shaft 35, on which are mounted both worms 26, which rotate the two worm wheels 27. Both eccentrics, 24 and 25, are inwardly directed, while the eccentric shafts 32 and 33 are at the same level. If now the worm shaft is rotated by means of the wheel 36, the one eccentric presses the corresponding block down and the other up, whereby according to the direction of rotation, a stronger or weaker pressure is exerted on the one or other roller bearing, which has a corresponding effect on the rolled material. The blocks 22 and 23 during rotation of the eccentrics slide between the flat surfaces of the members 28 and 29.

In the last embodiment according to Figures 10 and 11 the adjustment of the roller $d$ is effected by sliding the upper support or abutment member 37 which is connected with the member 38 joining the roller bearings $f$ and $h$ by oppositely inclined toggle members 39 and 40. These toggle members engage with cylindrical heads 41 and 42 in corresponding hollows in the members 37 and 38. The lateral sliding of the abutment member 37 by means of the spindle 43 and hand wheel 44 alters the inclination of the two toggle members 39 and 40 which produces differing pressures on the roller bearings and thus tilts the roller.

What I claim is:—

1. In a sheet rolling mill, a multiplicity of rollers one only of which is mounted for oscillatory movement with respect to the other, and cooperating means one of which is movable in the arc of a circle with respect to the other to allow said oscillation and prevent uneven rolling of the material between said rollers.

2. In a rolling mill, cooperative rollers, one only of which is mounted for oscillation, the axis of oscillation of the one roller being approximately at the center of the contact line between said rollers, and cooperating members one of which is mounted for oscillatory movement about the axis of oscillation of said oscillatory roller, and means controlling the relative movement of said cooperating members.

3. In a rolling mill, cooperative rollers, on of which is mounted for oscillation relative to the other, an oscillatory member, a member cooperating therewith, said members provided with lateral arms, and means cooperating with said arms for varying the distance therebetween to permit movement of the oscillatory roller.

4. In a sheet rolling mill, cooperating rollers one only of which is mounted for oscillatory movement with relation to the other, cooperating members having cooperative convex and concave surfaces, and means cooperative with one of said members for giving relative movement to said members to give movement to the oscillatory roller.

5. A rolling mill, embodying a multiplicity of rollers one of which is mounted for oscillatory movement with respect to the other, cooperating means, one member of which has oscillatory movement with respect to the other, and two outwardly directed arms, a screw spindle and a control wheel, by which the adjustment of the oscillatable roller by said oscillating member is effected, by said two outwardly directed arms, and said oscillatory member moved to and fro by said screw spindle and control wheel.

6. In a rolling mill, a roller frame, a lower roller mounted therein, an oscillatory roller cooperating therewith, cooperating superposed members having coacting concave and convex surfaces, simultaneously movable means coacting with the uppermost surface, and means for actuating said movable means for relative adjustment of the uppermost roller.

7. In a rolling mill, cooperating rollers, one of which is mounted for oscillation relative to the other, means for varying the movement of the oscillatory roller in reference to the other to accord with the thickness of the material to be rolled, and superposed means operative to compensate for unevenness in the material to be rolled and yet insure maintenance of the required thickness of such material.

In testimony whereof I affix my signature.

RUDOLF KRONENBERG.